US012478740B2

(12) United States Patent
Jugl et al.

(10) Patent No.: US 12,478,740 B2
(45) Date of Patent: Nov. 25, 2025

(54) INJECTION DEVICE (71) Applicant: SANOFI, Paris (FR)

(72) Inventors: Michael Jugl, Frankfurt am Main (DE); Maurice Toporek, Frankfurt am Main (DE); Stefan Blancke, Frankfurt am Main (DE); Stephan Müller-Pathle, Frankfurt am Main (DE)

(73) Assignee: Sanofi, Paris (FR)

( * ) Notice: Subject to any disclaimer, the term of this patent is extended or adjusted under 35 U.S.C. 154(b) by 1290 days.

(21) Appl. No.: 17/040,400

(22) PCT Filed: Mar. 25, 2019

(86) PCT No.: PCT/EP2019/057394
§ 371 (c)(1),
(2) Date: Sep. 22, 2020

(87) PCT Pub. No.: WO2019/185518
PCT Pub. Date: Oct. 3, 2019

(65) Prior Publication Data
US 2021/0113778 A1 Apr. 22, 2021

(30) Foreign Application Priority Data
Mar. 28, 2018 (EP) ..................... 18305347

(51) Int. Cl.
*A61M 5/315* (2006.01)
*A61M 5/20* (2006.01)
*A61M 5/31* (2006.01)

(52) U.S. Cl.
CPC ...... *A61M 5/31551* (2013.01); *A61M 5/2033* (2013.01); *A61M 5/3157* (2013.01);
(Continued)

(58) Field of Classification Search
CPC ............ A61M 5/31551; A61M 5/2033; A61M 5/3157; A61M 5/31585;
(Continued)

(56) References Cited

U.S. PATENT DOCUMENTS 10,004,852 B2 6/2018 Marsh et al.
10,420,889 B2 9/2019 Marsh et al.
(Continued)

FOREIGN PATENT DOCUMENTS

CN 104203315 12/2014
CN 104394916 3/2015
(Continued)

OTHER PUBLICATIONS

PCT International Search Report and Written Opinion in International Appln. No. PCT/EP2019/057394, dated May 28, 2019, 11 pages.
(Continued)

*Primary Examiner* — Kami A Bosworth
*Assistant Examiner* — Avery Smale
(74) *Attorney, Agent, or Firm* — Bond, Schoeneck & King, PLLC (57) ABSTRACT An injection device comprising a housing with a receptacle for a product, a dosing mechanism for setting a product dosage to be administered and for displaying the set product dosage and a dispensing mechanism for dispensing the product. The dispensing mechanism may include a piston rod, at least one sleeve rotatable relative to the housing to eject the set product dosage, and a button moveable relative to the housing and relative to the at least one sleeve in a dispensing direction from a dosing position into a dispensing position to eject the set product dosage. The injection device can further include a first detector for detecting a position of the button relative to the housing or the at least one sleeve,
(Continued)

a second detector for detecting rotational movement of the at least one sleeve or a component part coupled to the at least one sleeve and a feedback generator mechanism.

15 Claims, 2 Drawing Sheets

(52) U.S. Cl.
CPC . *A61M 5/31585* (2013.01); *A61M 2005/3126* (2013.01); *A61M 2205/3306* (2013.01); *A61M 2205/3317* (2013.01); *A61M 2205/3375* (2013.01); *A61M 2205/581* (2013.01); *A61M 2205/582* (2013.01)

(58) Field of Classification Search
CPC .. A61M 2005/3126; A61M 5/20; A61M 5/24; A61M 2005/3125; A61M 5/315; A61M 5/31525; A61M 5/31533; A61M 5/3155; A61M 2205/3306; A61M 2205/3317; A61M 2205/3375; A61M 2205/581; A61M 2205/582; A61M 2205/583; A61M 5/31568; A61M 5/31566
See application file for complete search history.

(56) References Cited

U.S. PATENT DOCUMENTS

| | | |
|---|---|---|
| 2014/0128843 A1 | 5/2014 | Baker et al. |
| 2015/0202377 A1 | 7/2015 | Haupt |
| 2016/0030683 A1* | 2/2016 | Taylor ................ A61M 5/345 604/151 |
| 2019/0160229 A1* | 5/2019 | Alagia .............. A61M 5/31551 |

FOREIGN PATENT DOCUMENTS

| | | | |
|---|---|---|---|
| CN | 105263546 A | 1/2016 | |
| CN | 106535965 A | 3/2017 | |
| CN | 107405449 | 11/2017 | |
| EP | 2814547 | 12/2014 | |
| EP | 3067081 | 9/2016 | |
| EP | 3067081 A1 * | 9/2016 | ............. A61M 5/20 |
| EP | 3175876 A1 * | 6/2017 | ............. A61M 5/19 |
| JP | 2015-506771 | 3/2015 | |
| JP | 2015-516242 | 6/2015 | |
| WO | WO 2013/120778 | 8/2013 | |
| WO | WO 2013/170392 | 11/2013 | |
| WO | WO 2014/023763 | 2/2014 | |
| WO | WO 2014/117944 | 8/2014 | |
| WO | WO 2016/001304 | 1/2016 | |
| WO | WO 2016/016184 | 2/2016 | |
| WO | WO 2016/142511 | 9/2016 | |
| WO | WO 2017/118705 | 7/2017 | |
| WO | WO 2017/134131 | 8/2017 | |

OTHER PUBLICATIONS

PCT International Preliminary Report on Patentability in International Application No. PCT/EP2019/057394, dated Sep. 29, 2020, 8 pages.

* cited by examiner

INJECTION DEVICE

CROSS-REFERENCE TO RELATED APPLICATIONS

The present application is the national stage entry of International Patent Application No. PCT/EP2019/057394, filed on Mar. 25, 2019, and claims priority to Application No. EP 18305347.9, filed on Mar. 28, 2018, the disclosures of which are incorporated herein by reference.

TECHNICAL FIELD

The present disclosure is generally directed to an injection device, i.e. a drug delivery device for selecting and dispensing a number of user variable doses of a medicament.

BACKGROUND

Pen type drug delivery devices have application where regular injection by persons without formal medical training occurs. This may be increasingly common among patients having diabetes where self-treatment enables such patients to conduct effective management of their disease. In practice, such a drug delivery device allows a user to individually select and dispense a number of user variable doses of a medicament. The present disclosure is not directed to so called fixed dose devices which only allow dispensing of a predefined dose without the possibility to increase or decrease the set dose.

There are basically two types of drug delivery devices: resettable devices (i.e., reusable) and non-resettable (i.e., disposable). For example, disposable pen delivery devices are supplied as self-contained devices. Such self-contained devices do not have removable pre-filled cartridges. Rather, the pre-filled cartridges may not be removed and replaced from these devices without destroying the device itself. Consequently, such disposable devices need not have a resettable dose setting mechanism. The present disclosure is applicable for both types of devices, i.e. for disposable devices as well as for reusable devices.

These types of pen delivery devices (so named because they often resemble an enlarged fountain pen) generally comprise three primary elements: a cartridge section that includes a cartridge often contained within a housing or holder; a needle assembly connected to one end of the cartridge section; and a dosing section connected to the other end of the cartridge section. A cartridge (often referred to as an ampoule) typically includes a reservoir that is filled with a medication (e.g., insulin), a movable rubber type bung or stopper located at one end of the cartridge reservoir, and a top having a pierceable rubber seal located at the other, often necked-down, end. A crimped annular metal band is typically used to hold the rubber seal in place. While the cartridge housing may be typically made of plastic, cartridge reservoirs have historically been made of glass.

The needle assembly is typically a replaceable double-ended needle assembly. Before an injection, a replaceable double-ended needle assembly is attached to one end of the cartridge assembly, a dose is set, and then the set dose is administered. Such removable needle assemblies may be threaded onto, or pushed (i.e., snapped) onto the pierceable seal end of the cartridge assembly.

The dosing section or dose setting mechanism is typically the portion of the pen device that is used to set (select) a dose. During an injection, a spindle or piston rod contained within the dose setting mechanism presses against the bung or stopper of the cartridge. This force causes the medication contained within the cartridge to be injected through an attached needle assembly. After an injection, as generally recommended by most drug delivery device and/or needle assembly manufacturers and suppliers, the needle assembly is removed and discarded.

A further differentiation of drug delivery device types relates to the drive mechanism. There are devices which are manually driven, e.g. by a user applying a force to an injection button, and devices which are driven by a spring or the like and devices which combine these two concepts, i.e. spring assisted devices which still require a user to exert an injection force. The spring-type devices include springs which are preloaded and springs which are loaded by the user during dose selecting. Some stored-energy devices use a combination of spring preload and additional energy provided by the user, for example, during dose setting.

SUMMARY

The present disclosure relates to an injection device or a drug delivery device giving a reliable feedback to users at the beginning and/or end of the dispensing process. Preferably, the mechanism does not generate a signal during dose resetting.

An injection device according to the present disclosure comprises a housing with a receptacle for the product, a dosing mechanism for setting a product dosage to be administered and for displaying the set product dosage and a dispensing mechanism for dispensing the product. The dispensing mechanism of the device may comprise a piston rod, which is moveable relative to the housing in a dispensing direction in order to eject the set product dosage in a dispensing stroke corresponding to the set product dosage, at least one sleeve, which is rotatable relative to the housing in order to eject the set product dosage, and a component part, like a button or a clutch, which is moveable relative to the housing and relative to the at least one sleeve in the dispensing direction from a dosing position into a dispensing position in order to eject the set product dosage. The present disclosure is based on the idea that detecting movements of component parts of the injection device may be used to identify the beginning and/or the end of dose dispensing and that a feedback signal may be generated based on this information.

For example, the device may further comprise a first detector for detecting the position of a component part, e.g. the button or clutch, relative to the housing or the at least one sleeve, a second detector for detecting rotational movement of the at least one sleeve or a component part coupled to the at least one sleeve and a feedback generator mechanism connected to the first and second detector for generating a feedback responsive to signals received from the first and second detector. In more detail, if an actuation of the button or clutch is required to eject the set product dosage, actuation of the button or clutch may be detected to identify that the injection device is in the dose dispensing mode compared to a dose setting or dose correction mode or a resetting mode. In addition, if rotation of a sleeve is required to eject the set product dosage, rotation of the sleeve may be detected to identify the start and/or the end of dose dispensing.

As an alternative, if rotation of a sleeve only occurs during dose dispensing and does not occur during dose setting or dose correction nor during resetting of the device, it may be sufficient to detect rotation of the sleeve to identify the start and/or the end of dose dispensing.

According to an embodiment of the disclosure, at least one of the first detector, the second detector and the feedback generator mechanism is integrated and built into the injection device. In other words, the first detector, the second detector and/or the feedback generator mechanism is permanently attached or formed in one piece with a component part of the injection device. Preferably, the first detector, the second detector and/or the feedback generator mechanism is encased by the housing. As an alternative embodiment, at least one of the first detector, the second detector and the feedback generator mechanism is part of a separate, e.g. external, unit which may be attached, e.g. releasable attached, to the injection device.

The injection device according to the present disclosure may be a device as disclosed in EP 2 814 547 B1, WO 2014/117944 A1, WO 2016/016184 A1, WO 2017/134131 A1 or in WO 2016/001304 A1. For example, the button may be the ejection knob shown in FIG. 1 of EP 2 814 547 B1, while the rotatable sleeve may be the threaded nut or of the coupling sleeve shown in FIG. 1 of EP 2 814 547 B1. The component part coupled to the sleeve may be the stop wheel shown in the FIG. 1, 4, 10, or 15 of EP 2 814 547 B1.

As an alternative, the button may be the button shown in FIGS. 1 to 3 of WO 2016/001304 A1, while the rotatable sleeve for may be the driver or the number sleeve shown in FIG. 3 of WO 2016/001304 A1.

Further, the clutch may be the axially movable clutch of WO 2014/117944 A1, while the rotatable sleeve may be the drive tube and/or the component part coupled to the sleeve may be end-of-content ring of WO 2014/117944 A1. In WO 2016/016184 A1 the rotatable sleeve may be the rotational element with the cam surface and/or the component part coupled to the sleeve may be end-of-content element interacting with the cam surface.

Still further, the clutch moving between the dosing position and the dispensing position may be the clutch operable by a needle shield or sliding button shown in FIG. 2 of WO 2017/134131 A1, while the rotatable sleeve may be the dose setting element and/or the component part coupled to the sleeve may be the disc-shaped end-of-content element of WO 2017/134131 A1.

Thus, the idea of detecting movements of component parts of the injection device to identify the beginning and/or the end of dose dispensing and generating a feedback signal based on this information is applicable to a variety of different injection devices irrespective of the different concepts of the devices, i.e. the disclosure finds application in re-usable and disposable devices, in manually driven devices and in fully or partially spring driven devices. Different concepts of dosing mechanisms or dispensing mechanisms may be applied including devices requiring a rotation of a component part or requiring an axial movement of a component part for dose setting and/or devices with a rotating piston rod, e.g. along a helical path, or devices with a piston rod which is rotationally constrained to the housing.

According to an embodiment of the disclosure, the button may comprise a disk and a stem. For example, the stem may extend at least partially into the at least one sleeve, wherein the sleeve comprises a web located such that the stem is spaced from the web in the dosing position of the button or the clutch. Actuation of the stem may be detected by the first detector. As an example, the web may be located such that the stem abuts the web in the dispensing position of the button or clutch. The abutment of the stem on the web may be detected by the first detector. This may be achieved by providing the stem and the web with electrical contacts which close an electrical circuit by abutment of the stem on the web. As an alternative, the first detector may be interposed between the button or clutch and the at least one sleeve, for example such that the detector is retained on the stem or web such that the first detector is able to detect contact with the web or stem.

As an alternative, the first detector comprises at least one of an optical sensor, a capacitive sensor, an inductive sensor, a magnetic sensor, a galvanic sensor or switch and a mechanical sensor. This may require that the button or clutch is adapted for a detection by the first detector. For example, if the first detector is an optical sensor, the button or clutch may be provided with at least one marking which may be detected by the optical sensor. As an alternative, the button or clutch may comprise at least a portion of a material permitting detection by an inductive sensor or a magnetic sensor.

The injection device may further comprise a spring interposed between the button and the at least one sleeve such that the button is biased into its dosing position. In other words, the spring may retain the button in its dosing position such that the bottom is moved into its dispensing position only if a sufficient force is applied to the button by a user when effecting or initiating dose dispensing. As an alternative, it may be required to manually retract the button from the dispensing position into the dosing position.

The at least one sleeve may be a component part which is in direct engagement with the piston rod. For example, the at least one sleeve may be a drive sleeve which is splined to the piston rod or which is in threaded engagement with the piston rod. However, as an alternative, the at least one sleeve may be a component part which is indirectly coupled to the piston rod, for example with a clutch or a transmission element interposed between the at least one sleeve and the piston rod. The at least one sleeve may be permanently coupled to the piston rod or may be selectively coupled to the piston rod only in a certain mode of the injection device, for example during dose dispensing.

The injection device may comprise two sleeves, which are rotatable relative to the housing in order to eject the set product dosage and which are rotationally constrained relative to each other but displaceable relative to each other in the dispensing direction. The second detector may detect actuation, i.e. rotation, of one of these sleeves or of both sleeves.

Optionally, the injection device further comprises a stop wheel, for example an end-of-content stop wheel, coupled to the at least one sleeve such that the stop wheel is rotatable relative to the housing together with the at least one sleeve in order to eject the set product dosage. The second detector may detect movement of the stop wheel in addition or as an alternative to detecting the movement of the at least one sleeve.

The second detector may be of the same type as the first detector or may be a different type of detector. For example, the second detector comprises at least one of an optical sensor, a capacitive sensor, an inductive sensor, a magnetic sensor, a galvanic sensor or switch, a mechanical sensor and an acoustical sensor. The at least one sleeve and/or the component part coupled to the at least one sleeve may be adapted such that the second detector is able to detect movement, especially rotation, of the at least one sleeve and/or the component part coupled to the at least one sleeve.

The injection device may be provided with at least one clicker mechanism for generating a feedback signal during movement of component parts of the device, e.g. during dose setting, dose correcting, dose dispensing and/or resetting of the device. For example, the at least one sleeve is provided with a clicker mechanism for generating a feedback signal during rotational movement of the at least one sleeve relative to the housing during dose dispensing.

The feedback generator mechanism is preferably adapted and arranged such that a start of dispensing feedback is generated upon detection of the button or clutch being in its dispensing position by means of the first detector and detection of rotation (or beginning of rotation) of the at least one sleeve or a component part coupled to the at least one sleeve relative to the housing by means of the second detector. In addition or as an alternative, the feedback generator mechanism may be adapted and arranged such that an end of dispensing feedback is generated upon detection of the button or clutch being in its dosing position by means of the first detector and/or detection of stop of rotation of the at least one sleeve or a component part coupled to the at least one sleeve relative to the housing by means of the second detector.

The feedback generator may be provided within the housing of the injection device. For example, the feedback generator and the first and second detector may be permanently provided within the housing of the injection device. This includes embodiments in which the feedback generator is connected to at least one of the first and second detector by wire. As an alternative, the feedback generator mechanism may be detachable from the housing and/or may be connected to at least one of the first and second detector by means of a wireless connection. In other words, the feedback generator may be an add-on device which may be attached to the housing and removed from the housing.

The feedback generator may be adapted to generate the feedback signal immediately when receiving the information from one of the detectors that dose dispensing is stopped, i.e. by detecting that the button or clutch is in the dose setting position and that the at least one sleeve does not rotate. As an alternative, generation of a feedback signal may be delayed for a pre-set time, e.g. a dwelling time for which the user is typically asked to wait until the needle may be retracted from the skin. As a further alternative, an additional, e.g. different, feedback signal may be generated at the end of the dwelling time.

Further, if the detectors are adapted and arranged for detecting the amount of the set dosage, the feedback generator may be adapted to generate a feedback signal only if the set dose has been fully dispensed and/or may generate a different signal if the set dose has not been fully dispensed.

The injection device typically comprises a cartridge containing a medicament. The term "medicament", as used herein, means a pharmaceutical formulation containing at least one pharmaceutically active compound, wherein in one embodiment the pharmaceutically active compound has a molecular weight up to 1500 Da and/or is a peptide, a proteine, a polysaccharide, a vaccine, a DNA, a RNA, an enzyme, an antibody or a fragment thereof, a hormone or an oligonucleotide, or a mixture of the above-mentioned pharmaceutically active compound, wherein in a further embodiment the pharmaceutically active compound is useful for the treatment and/or prophylaxis of diabetes mellitus or complications associated with diabetes mellitus such as diabetic retinopathy, thromboembolism disorders such as deep vein or pulmonary thromboembolism, acute coronary syndrome (ACS), angina, myocardial infarction, cancer, macular degeneration, inflammation, hay fever, atherosclerosis and/or rheumatoid arthritis, wherein in a further embodiment the pharmaceutically active compound comprises at least one peptide for the treatment and/or prophylaxis of diabetes mellitus or complications associated with diabetes mellitus such as diabetic retinopathy, wherein in a further embodiment the pharmaceutically active compound comprises at least one human insulin or a human insulin analogue or derivative, glucagon-like peptide (GLP-1) or an analogue or derivative thereof, or exendin-3 or exendin-4 or an analogue or derivative of exendin-3 or exendin-4.

Insulin analogues are for example Gly(A21), Arg(B31), Arg(B32) human insulin; Lys(B3), Glu(B29) human insulin; Lys(B28), Pro(B29) human insulin; Asp(B28) human insulin; human insulin, wherein proline in position B28 is replaced by Asp, Lys, Leu, Val or Ala and wherein in position B29 Lys may be replaced by Pro; Ala(B26) human insulin; Des(B28-B30) human insulin; Des(B27) human insulin and Des(B30) human insulin.

Insulin derivates are for example B29-N-myristoyl-des (B30) human insulin; B29-N-palmitoyl-des(B30) human insulin; B29-N-myristoyl human insulin; B29-N-palmitoyl human insulin; B28-N-myristoyl LysB28ProB29 human insulin; B28-N-palmitoyl-LysB28ProB29 human insulin; B30-N-myristoyl-ThrB29LysB30 human insulin; B30-N-palmitoyl-ThrB29LysB30 human insulin; B29-N—(N-palmitoyl-Y-glutamyl)-des(B30) human insulin; B29-N—(N-lithocholyl-Y-glutamyl)-des(B30) human insulin; B29-N-(ω-carboxyheptadecanoyl)-des(B30) human insulin and B29-N-(ω-carboxyheptadecanoyl) human insulin.

Exendin-4 for example means Exendin-4(1-39), a peptide of the sequence H-His-Gly-Glu-Gly-Thr-Phe-Thr-Ser-Asp-Leu-Ser-Lys-Gln-Met-Glu-Glu-Glu-Ala-Val-Arg-Leu-Phe-Ile-Glu-Trp-Leu-Lys-Asn-Gly-Gly-Pro-Ser- Ser-Gly-Ala-Pro-Pro-Pro-Ser-NH2.

Exendin-4 derivatives are for example selected from the following list of compounds:

H-(Lys)4-des Pro36, des Pro37 Exendin-4(1-39)-NH2,
H-(Lys)5-des Pro36, des Pro37 Exendin-4(1-39)-NH2,
des Pro36 Exendin-4(1-39),
des Pro36 [Asp28] Exendin-4(1-39),
des Pro36 [IsoAsp28] Exendin-4(1-39),
des Pro36 [Met(O)14, Asp28] Exendin-4(1-39),
des Pro36 [Met(O)14, IsoAsp28] Exendin-4(1-39),
des Pro36 [Trp(O2)25, Asp28] Exendin-4(1-39),
des Pro36 [Trp(O2)25, IsoAsp28] Exendin-4(1-39),
des Pro36 [Met(O)14 Trp(O2)25, Asp28] Exendin-4(1-39),
des Pro36 [Met(O)14 Trp(O2)25, IsoAsp28] Exendin-4 (1-39); or
des Pro36 [Asp28] Exendin-4(1-39),
des Pro36 [IsoAsp28] Exendin-4(1-39),
des Pro36 [Met(O)14, Asp28] Exendin-4(1-39),
des Pro36 [Met(O)14, IsoAsp28] Exendin-4(1-39),
des Pro36 [Trp(O2)25, Asp28] Exendin-4(1-39),
des Pro36 [Trp(O2)25, IsoAsp28] Exendin-4(1-39),
des Pro36 [Met(O)14 Trp(O2)25, Asp28] Exendin-4(1-39),
des Pro36 [Met(O)14 Trp(O2)25, IsoAsp28] Exendin-4 (1-39),
wherein the group-Lys6-NH2 may be bound to the C-terminus of the Exendin-4 derivative;
or an Exendin-4 derivative of the sequence
des Pro36 Exendin-4(1-39)-Lys6-NH2 (AVE0010),
H-(Lys)6-des Pro36 [Asp28] Exendin-4(1-39)-Lys6-NH2,
des Asp28 Pro36, Pro37, Pro38Exendin-4(1-39)-NH2,
H-(Lys)6-des Pro36, Pro38 [Asp28] Exendin-4(1-39)-NH2, H-Asn-(Glu)5des Pro36, Pro37, Pro38 [Asp28] Exendin-4(1-39)-NH2,
des Pro36, Pro37, Pro38 [Asp28] Exendin-4(1-39)-(Lys)6-NH2,
H-(Lys)6-des Pro36, Pro37, Pro38 [Asp28] Exendin-4(1-39)-(Lys)6-NH2,
H-Asn-(Glu)5-des Pro36, Pro37, Pro38 [Asp28] Exendin-4(1-39)-(Lys)6-NH2,
H-(Lys)6-des Pro36 [Trp(O2)25, Asp28] Exendin-4(1-39)-Lys6-NH2,
H-des Asp28 Pro36, Pro37, Pro38 [Trp(O2)25] Exendin-4(1-39)-NH2,
H-(Lys)6-des Pro36, Pro37, Pro38 [Trp(O2)25, Asp28] Exendin-4(1-39)-NH2,
H-Asn-(Glu)5-des Pro36, Pro37, Pro38 [Trp(O2)25, Asp28] Exendin-4(1-39)-NH2,
des Pro36, Pro37, Pro38 [Trp(O2)25, Asp28] Exendin-4(1-39)-(Lys)6-NH2,
H-(Lys)6-des Pro36, Pro37, Pro38 [Trp(O2)25, Asp28] Exendin-4(1-39)-(Lys)6-NH2,
H-Asn-(Glu)5-des Pro36, Pro37, Pro38 [Trp(O2)25, Asp28] Exendin-4(1-39)-(Lys)6-NH2,
H-(Lys)6-des Pro36 [Met(O)14, Asp28] Exendin-4(1-39)-Lys6-NH2,
des Met(O)14 Asp28 Pro36, Pro37, Pro38 Exendin-4(1-39)-NH2,
H-(Lys)6-desPro36, Pro37, Pro38 [Met(O)14, Asp28] Exendin-4(1-39)-NH2,
H-Asn-(Glu)5-des Pro36, Pro37, Pro38 [Met(O)14, Asp28] Exendin-4(1-39)-NH2,
des Pro36, Pro37, Pro38 [Met(O)14, Asp28] Exendin-4(1-39)-(Lys)6-NH2,
H-(Lys)6-des Pro36, Pro37, Pro38 [Met(O)14, Asp28] Exendin-4(1-39)-(Lys)6-NH2,
H-Asn-(Glu)5 des Pro36, Pro37, Pro38 [Met(O)14, Asp28] Exendin-4(1-39)-(Lys)6-NH2,
H-Lys6-des Pro36 [Met(O)14, Trp(O2)25, Asp28] Exendin-4(1-39)-Lys6-NH2,
H-des Asp28 Pro36, Pro37, Pro38 [Met(O)14, Trp(O2)25] Exendin-4(1-39)-NH2,
H-(Lys)6-des Pro36, Pro37, Pro38 [Met(O)14, Asp28] Exendin-4(1-39)-NH2,
H-Asn-(Glu)5-des Pro36, Pro37, Pro38 [Met(O)14, Trp(O2)25, Asp28] Exendin-4(1-39)-NH2,
des Pro36, Pro37, Pro38 [Met(O)14, Trp(O2)25, Asp28] Exendin-4(1-39)-(Lys)6-NH2,
H-(Lys)6-des Pro36, Pro37, Pro38 [Met(O)14, Trp(O2)25, Asp28] Exendin-4(S1-39)-(Lys)6-NH2,
H-Asn-(Glu)5-des Pro36, Pro37, Pro38 [Met(O)14, Trp(O2)25, Asp28] Exendin-4(1-39)-(Lys)6-NH2;

or a pharmaceutically acceptable salt or solvate of any one of the afore-mentioned Exendin-4 derivative.

Hormones are for example hypophysis hormones or hypothalamus hormones or regulatory active peptides and their antagonists as listed in Rote Liste, ed. 2008, Chapter 50, such as Gonadotropine (Follitropin, Lutropin, Choriongonadotropin, Menotropin), Somatropine (Somatropin), Desmopressin, Terlipressin, Gonadorelin, Triptorelin, Leuprorelin, Buserelin, Nafarelin, Goserelin.

A polysaccharide is for example a glucosaminoglycane, a hyaluronic acid, a heparin, a low molecular weight heparin or an ultra low molecular weight heparin or a derivative thereof, or a sulphated, e.g. a poly-sulphated form of the above-mentioned polysaccharides, and/or a pharmaceutically acceptable salt thereof. An example of a pharmaceutically acceptable salt of a poly-sulphated low molecular weight heparin is enoxaparin sodium.

Antibodies are globular plasma proteins (~150 kDa) that are also known as immunoglobulins which share a basic structure. As they have sugar chains added to amino acid residues, they are glycoproteins. The basic functional unit of each antibody is an immunoglobulin (Ig) monomer (containing only one Ig unit); secreted antibodies can also be dimeric with two Ig units as with IgA, tetrameric with four Ig units like teleost fish IgM, or pentameric with five Ig units, like mammalian IgM.

The Ig monomer is a "Y"-shaped molecule that consists of four polypeptide chains; two identical heavy chains and two identical light chains connected by disulfide bonds between cysteine residues. Each heavy chain is about 440 amino acids long; each light chain is about 220 amino acids long. Heavy and light chains each contain intrachain disulfide bonds which stabilize their folding. Each chain is composed of structural domains called Ig domains. These domains contain about 70-110 amino acids and are classified into different categories (for example, variable or V, and constant or C) according to their size and function. They have a characteristic immunoglobulin fold in which two β sheets create a "sandwich" shape, held together by interactions between conserved cysteines and other charged amino acids. There are five types of mammalian Ig heavy chain denoted by α, δ, ε, γ, and μ. The type of heavy chain present defines the isotype of antibody; these chains are found in IgA, IgD, IgE, IgG, and IgM antibodies, respectively.

Distinct heavy chains differ in size and composition; α and γ contain approximately 450 amino acids and δ approximately 500 amino acids, while μ and ε have approximately 550 amino acids. Each heavy chain has two regions, the constant region (CH) and the variable region (VH). In one species, the constant region is essentially identical in all antibodies of the same isotype, but differs in antibodies of different isotypes. Heavy chains γ, α and δ have a constant region composed of three tandem Ig domains, and a hinge region for added flexibility; heavy chains μ and ε have a constant region composed of four immunoglobulin domains. The variable region of the heavy chain differs in antibodies produced by different B cells, but is the same for all antibodies produced by a single B cell or B cell clone. The variable region of each heavy chain is approximately 110 amino acids long and is composed of a single Ig domain.

In mammals, there are two types of immunoglobulin light chain denoted by λ and κ. A light chain has two successive domains: one constant domain (CL) and one variable domain (VL). The approximate length of a light chain is 211 to 217 amino acids. Each antibody contains two light chains that are always identical; only one type of light chain, κ or λ, is present per antibody in mammals.

Although the general structure of all antibodies is very similar, the unique property of a given antibody is determined by the variable (V) regions, as detailed above. More specifically, variable loops, three each the light (VL) and three on the heavy (VH) chain, are responsible for binding to the antigen, i.e. for its antigen specificity. These loops are referred to as the Complementarity Determining Regions (CDRs). Because CDRs from both VH and VL domains contribute to the antigen-binding site, it is the combination of the heavy and the light chains, and not either alone, that determines the final antigen specificity.

An "antibody fragment" contains at least one antigen binding fragment as defined above, and exhibits essentially the same function and specificity as the complete antibody of which the fragment is derived from. Limited proteolytic digestion with papain cleaves the Ig prototype into three fragments. Two identical amino terminal fragments, each containing one entire L chain and about half an H chain, are the antigen binding fragments (Fab). The third fragment, similar in size but containing the carboxyl terminal half of both heavy chains with their interchain disulfide bond, is the crystalizable fragment (Fc). The Fc contains carbohydrates, complement-binding, and FcR-binding sites. Limited pepsin digestion yields a single F(ab')2 fragment containing both Fab pieces and the hinge region, including the H-H interchain disulfide bond. F(ab')2 is divalent for antigen binding. The disulfide bond of F(ab')2 may be cleaved in order to obtain Fab'. Moreover, the variable regions of the heavy and light chains can be fused together to form a single chain variable fragment (scFv).

Pharmaceutically acceptable salts are for example acid addition salts and basic salts. Acid addition salts are e.g. HCl or HBr salts. Basic salts are e.g. salts having a cation selected from alkali or alkaline, e.g. Na+, or K+, or Ca2+, or an ammonium ion N+(R1)(R2)(R3)(R4), wherein R1 to R4 independently of each other mean: hydrogen, an optionally substituted C1-C6-alkyl group, an optionally substituted C2-C6-alkenyl group, an optionally substituted C6-C10-aryl group, or an optionally substituted C6-C10-heteroaryl group. Further examples of pharmaceutically acceptable salts are described in "Remington's Pharmaceutical Sciences" 17. ed. Alfonso R. Gennaro (Ed.), Mark Publishing Company, Easton, Pa., U.S.A., 1985 and in Encyclopedia of Pharmaceutical Technology.

Pharmaceutically acceptable solvates are for example hydrates.

BRIEF DESCRIPTION OF THE FIGURES

Non-limiting, exemplary embodiments of the disclosure will now be described with reference to the accompanying drawings, in which.

DETAILED DESCRIPTION

Figure 1:
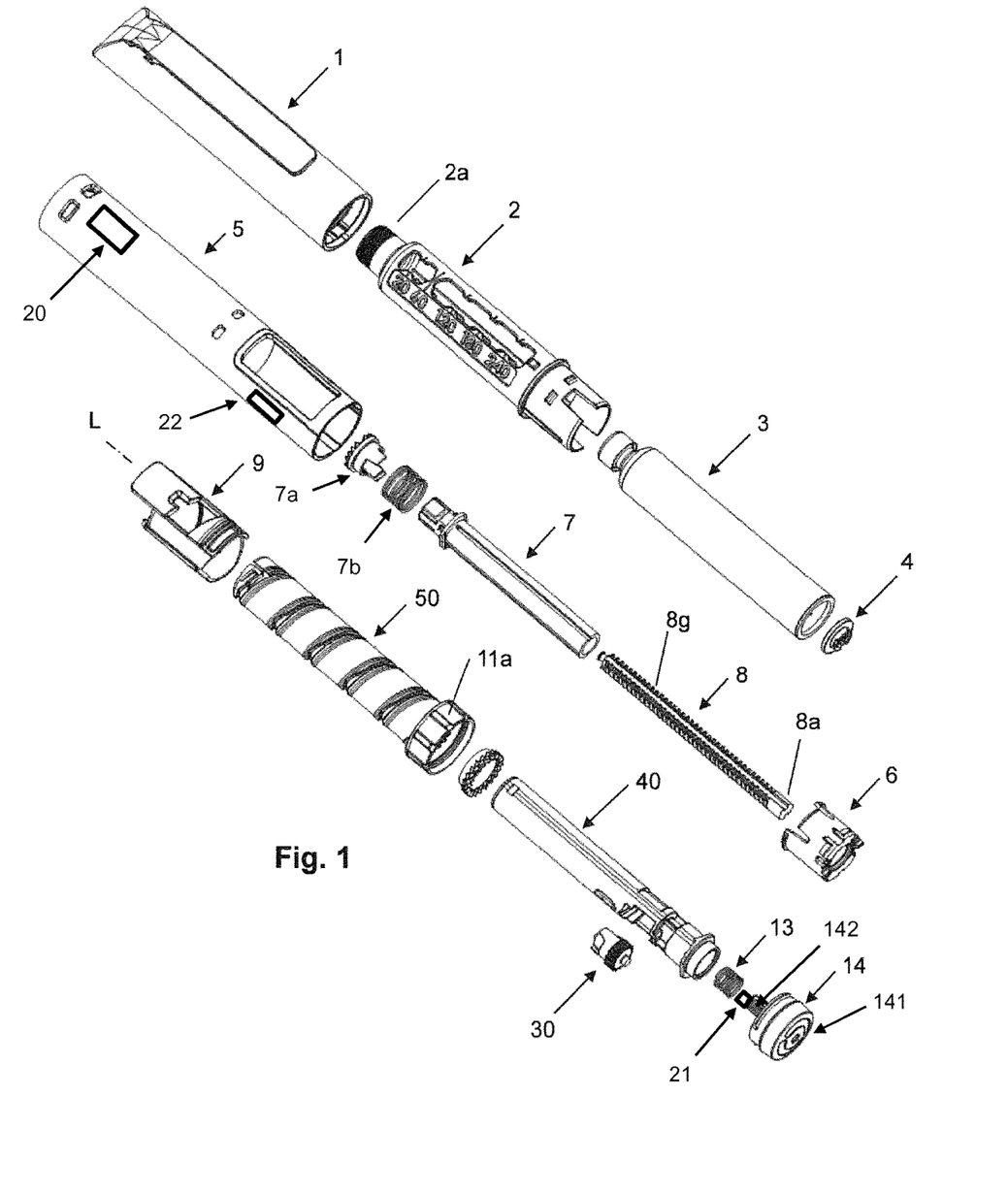
FIG. 1 shows an exploded view of the individual parts of an embodiment of an injection device according to the disclosure.

FIG. 1 shows an exploded view of the individual parts of an embodiment of an injection device according to the disclosure. This embodiment is designed as a so-called single-use pen. That is to say, the injection device is issued to the user fully assembled, i.e., with product to be administered.

The typical course of the injection process may be as follows: the user removes the protective cap 1 from the injection device and mounts an injection needle (not shown) on the needle holder 2a of a receptacle 2. Now the dosage can be adjusted via the rotary knob 11a. For this purpose, the rotary knob 11a is turned so that the dosing sleeve 50, which forms a dosing mechanism or is part of a dosing mechanism, is screwed out of the injection device.

The dosing sleeve 50 is screwed out of the injection device until the desired dosage is displayed in the window of the threaded sleeve 9. If an excessively high dosage is inadvertently set, the dosage can be corrected by turning the rotary knob in the opposite direction, whereby the dosing sleeve 50 is screwed back into the housing. The dosing device limits the maximum adjustable dosage to a predetermined value. If there is an attempt to screw the dosing sleeve out of the housing past this value, a radial limit stop on the dosing sleeve 50 and a counter-limit stop on the threaded sleeve 9 prevent further rotation by mutual interaction. During the dose setting and correction movements, the dosing sleeve 50 rotates relative to the coupling sleeve 40. The coupling sleeve 40 is held rotationally fixed in a form fit or friction fit against the housing 5 by a reverse rotation lock, for example by a toothed ring 7a rotationally fixed to the threaded nut 7 and biased axially towards a corresponding set of ratchet teeth on an inner surface of the housing 5 by a spring 7b. This ratchet between the housing 5 and the threaded nut 7 may form a clicker generating an audible and/or tactile feedback during dose dispensing as the teeth of ring 7a slip over the corresponding teeth of housing 5.

The coupling sleeve 40 is permanently rotationally locked to the axially stationary threaded nut 7 by splines permitting relative axial movement between the coupling sleeve 40 which is axially entrained by the dosing sleeve 50 and the stationary threaded nut 7. The threaded nut 7 may be retained in the housing 5 by an insert 6 holding the threaded nut 7 against the bias of spring 7b. A toothed ring is shown in FIG. 1 which is interposed between rotary knob 11a and a flange on the coupling sleeve 40 such that relative rotation of the dosing sleeve 50 and the coupling sleeve 40 is permitted during dose setting.

If the desired dosage has been set, the injection needle can be inserted at the intended position on the body of the user. Then the user pushes the ejection button 14 in the distal axial direction against the bias of spring 13 which is interposed between button 14 and coupling sleeve 40. This axial movement blocks a relative rotation between the coupling sleeve 40 and the dosing sleeve 50 by the toothed ring. In case of further pressure in the distal axial direction, the dosing sleeve begins to move back into the housing in a screwing motion. Because of the established rotational lock between the dosing sleeve 50 and the coupling sleeve 40, the coupling sleeve 40 carries out the same movement as the dosing sleeve 50. Because the coupling sleeve 40 is permanently rotationally locked to the axially stationary threaded nut 7, the rotational movement of the dosing sleeve 50 is transmitted to the threaded nut 7. No axial forces are transmitted to the threaded nut 7, because the coupling sleeve 40 is mounted axially movably on the threaded nut 7. Thus, the rotating threaded nut 7 produces an axial movement of the threaded piston rod 8 in the distal direction, wherein the latter is guided axially and locked rotationally in the housing 5 by means of splines 8a and is in threaded engagement with threaded nut 7 by means of an external thread 8g. The flange 4 acts on the plug of the cartridge 3 and pushes it, corresponding to the displacement of the threaded piston rod 8 in the distal direction as well, wherein the previously set dosage can be ejected or administered. At the end of the administration, when the dosing sleeve has been completely screwed back into the housing, radial stops on the dosing sleeve 50 and the threaded sleeve 9 prevent further ejection and rotation of the dosing device.

The embodiment of FIG. 1 shows an optional limiting device which ensures that the most recently set dosage can be completely ejected or injected. For this purpose, the dosing sleeve 50 has a coaxially applied inner toothing and the coupling sleeve 40 has a lateral cutout in which the stop wheel 30 is inserted. The function of the limiting device is described in EP 2 814 547 B1 in more detail.

The embodiment of FIG. 1 further shows a feedback generator mechanism 20 connected to a first detector 21 and a second detector 22 for generating a feedback responsive to signals received from the first and second detectors 21, 22. The feedback generator mechanism 20 is depicted as a component part being disposed on the outer surface of the housing 5. It may be permanently attached to the housing 5 or may be an integral part thereof or may be a separate, detachable unit. The feedback generator mechanism 20 may comprise a power supply and a PCB suitable for generating an audible and/or tactile and/or visual feedback, e.g. a sound and/or a vibration and/or a light.

Figure 2:
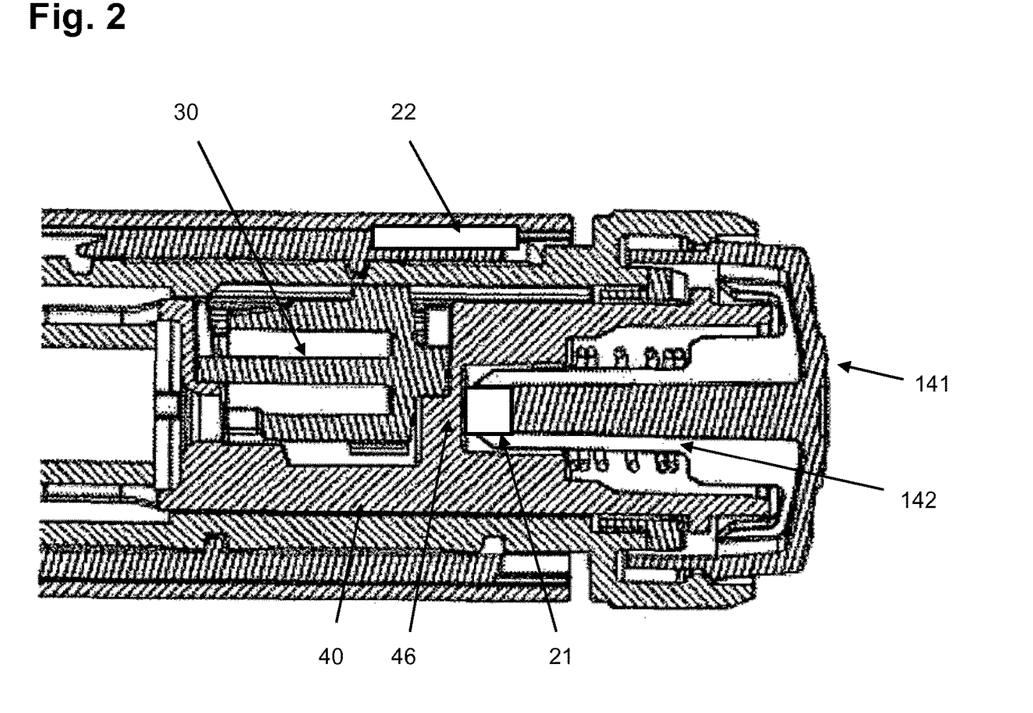
FIG. 2 shows a sectional view of a detail of the embodiment of FIG. 1.

The first detector 21 is disposed on the button 14, in more detail on a stem 142 extending from a disk 141 of the button 14. As can be seen in FIG. 2, the stem 142 extends into a cup-like end section of the coupling sleeve 40 which is provided with a web 46 for guiding stop wheel 30. When the button 14 is pressed to start dose dispensing, the distal tip of the stem 142 which carries the first detector 21 abuts the web 46 of the coupling sleeve 40. This abutment is detected by the first detector 21. In other words, the first detector 21 is arranged such that the state of the device where the button 14 is fully depressed against the bias of spring 13 is detected and state of the button 14 not being fully depressed, e.g. by releasing the button 14 after dose dispensing, may be detected, too. Thus, the position of the button relative to the coupling sleeve 40 is indicative for the state of the device, namely an idle state, a dose dialling or dose correcting state on the one hand (button 14 not fully depressed) and a dose dispensing state (button 14 fully depressed).

In the depicted embodiment, the first detector may be a simple mechanical switch or any other type of detector suitable for detecting contact between the stem 142 of the button and the web 46 of the coupling sleeve. Other types of detectors may be used to detect the position of the button relative to the coupling sleeve and/or relative to the housing. Such alternative detectors may be located on the button or on the coupling sleeve or on/in the housing.

The second detector 22 is disposed in or on the housing 5 at a position suitable for detecting rotational movement of the coupling sleeve 40, preferably irrespective of the axial position of the coupling sleeve, e.g. at or near the proximal end of housing 5. As an alternative to the depicted embodiment where the second detector 22 is arranged on an inner side of housing 5, the second detector 22 may be located on the outer side of housing 5 or on threaded sleeve 6. For example, the coupling sleeve 40 may be provided with markings detectable by an optical sensor as second detector 22 if the dosing sleeve 50 is at least partially transparent or translucent or provided with a window or the coupling sleeve 40 may be provided at least partially with a metallic material wherein rotation of this metallic portion is detectable by a sensor forming the second detector 22. As an alternative to detecting rotation of the coupling sleeve 40 rotation of stop wheel 30 and/or rotation of threaded nut 7 and/or rotation of the toothed ring 7a may be detected.

As an alternative, the second detector may comprise an acoustical sensor detecting the clicks generated during dose dispensing by the ratchet, i.e. by the teeth of ring 7a slipping over the corresponding teeth inside the housing 5.

In the device depicted in FIGS. 1 and 2, the threaded nut 7 and the coupling sleeve 40 are rotationally constrained to the housing 5 during dose setting or dose correcting, e.g. by means of clicker ratchet 7a, 7b, whereas the stop wheel 30 rotates relative to the coupling sleeve 40 during dose setting or dose correcting. On the other hand, the threaded nut 7 and the coupling sleeve 40 rotate relative to the housing 5 during dose dispensing, whereas the stop wheel 30 does not rotate relative to the coupling sleeve 40 during dose dispensing. Thus, the respective rotational movements may be used to identify whether the device actually dispenses a dose of medicament.

The combination of the signals received from the first detector 21 and the second detector 22 may be used to detect the beginning of dose dispensing (button 14 is fully depressed and the threaded nut 7 and the coupling sleeve 40 start rotating) and the end of dose dispensing (button 14 is released and the threaded nut 7 and the coupling sleeve 40 stop rotating). This information may be used in the feedback generator mechanism 20 for generating a respective feedback signal indicating the beginning of dose dispensing and/or the end of dose dispensing.

As the feedback generator mechanism 20 uses the signals of the first detector 21 and the second detector 22, a malfunction of the device will not result in generating the respective feedback signals. For example, if the needle would be blocked such that dispensing is prevented, the threaded nut 7 and the coupling sleeve 40 would not rotate although button 14 is depressed by the user for dose dispensing. As the threaded nut 7 and the coupling sleeve 40 do not rotate, no signal indicating start of dose dispensing will be generated. As an alternative, depressing the button 14 without having dialled a dose would not result in generating the signal, either. Further, an unintended rotation of the threaded nut 7 and the coupling sleeve 40 without depressing the button 14 would not result in generating the signal, either.

As mentioned above, the feature of a feedback generator mechanism 20 using the signals of a first detector 21 and a second detector 22 for verifying that a device starts or stops dispensing a dose may be applied to other drug delivery devices having a component part, like a button or a clutch which is actuated to initiate and/or effect dose dispensing, and a further component part, e.g. a sleeve, performing a certain axial and/or rotational movement only during dose dispensing. Examples for devices into which the feedback generator mechanism 20 with the first detector 21 and the second detector 22 may be implemented are disclosed in WO 2014/117944 A1, WO 2016/016184 A1, WO 2017/134131 A1 or in WO 2016/001304 A1

REFERENCE NUMERALS 1 cap
2 receptacle
2a needle holder
3 cartridge
4 flange
5 housing
6 insert
7 threaded nut
7a toothed ring
7b spring
8 piston rod
8a spline
8g thread
9 threaded sleeve
11a rotary knob
13 spring
14 button
141 disk
142 stem
20 feedback generator mechanism
21 first detector
22 second detector
30 stop wheel
40 coupling sleeve
46 web
50 dosing sleeve

The invention claimed is:

1. An injection device comprising:
   a housing with a receptacle for a medicament;
   a dosing mechanism for setting a medicament dosage to be administered and for displaying the set medicament dosage;
   a dispensing mechanism for dispensing the set medicament dosage, the dispensing mechanism comprising:
      a piston rod moveable relative to the housing in a dispensing direction to eject the set medicament dosage in a dispensing stroke corresponding to the set medicament dosage;
      at least one sleeve rotatable relative to the housing to eject the set medicament dosage; and
      a button moveable relative to the housing and relative to the at least one sleeve in the dispensing direction from a dosing position into a dispensing position to eject the set medicament dosage;
   a first detector for detecting a position of the button relative to the housing or the at least one sleeve;
   a second detector for detecting rotational movement of the at least one sleeve or a component part of the injection device coupled to the at least one sleeve; and
   a feedback generator mechanism connected to the first detector and the second detector, the feedback generator mechanism configured to;
      generate a first feedback indicative of a start of dispensing upon (i) detection of the button being in the dispensing position by the first detector and (ii) detection of the rotational movement of the at least one sleeve relative to the housing by the second detector, and
      generate a second feedback indicative of an end of dispensing upon (i) detection of the button being in the dosing position by the first detector and/or (ii) detection of a stop of the rotational movement of the at least one sleeve relative to the housing by the second detector,
   wherein the first detector, the second detector, and the feedback generator mechanism are integrated together and built into the injection device, and further wherein the first detector, the second detector, and the feedback generator mechanism are encased within the housing.

2. The injection device according to claim 1, wherein the button comprises a disk and a stem, the stem extending at least partially into the at least one sleeve, and
   wherein the at least one sleeve comprises a web located such that the stem is spaced from the web when the button is in the dosing position, and the stem abuts the web when the button is in the dispensing position.

3. The injection device according to claim 1, wherein the first detector is interposed between the button and the at least one sleeve.

4. The injection device according to claim 1, wherein the first detector comprises at least one of an optical sensor, a capacitive sensor, an inductive sensor, a magnetic sensor, a galvanic sensor or switch, or a mechanical sensor.

5. The injection device according to claim 1, further comprising a spring interposed between the button and the at least one sleeve such that the button is biased into the dosing position.

6. The injection device according to claim 1, wherein the at least one sleeve is in direct engagement with the piston rod.

7. The injection device according to claim 1, wherein the at least one sleeve comprises two sleeves rotatable relative to the housing to eject the set medicament dosage.

8. The injection device according to claim 7, wherein the two sleeves are rotationally constrained relative to each other.

9. The injection device according to claim 7, wherein the two sleeves are displaceable relative to each other in the dispensing direction.

10. The injection device according to claim 1, further comprising a stop wheel coupled to the at least one sleeve such that the stop wheel is rotatable relative to the housing together with the at least one sleeve in order to eject the set medicament dosage.

11. The injection device according to claim 1, wherein the second detector comprises at least one of an optical sensor, a capacitive sensor, an inductive sensor, a magnetic sensor, a galvanic sensor or switch, a mechanical sensor, or an acoustical sensor.

12. The injection device according to claim 1, wherein the at least one sleeve comprises a clicker mechanism comprising one or more teeth for generating a feedback signal during the rotational movement of the at least one sleeve relative to the housing to eject the set medicament dosage.

13. The injection device according to claim 1, wherein the feedback generator mechanism is connected to at least one of the first detector or the second detector by a wire.

14. The injection device according to claim 1, wherein the feedback generator mechanism is connected to at least one of the first detector or the second detector by a wireless connection.

15. The injection device according to claim 1, wherein the component part of the injection device is a stop wheel coupled to the at least one sleeve such that the stop wheel is rotatable relative to the housing together with the at least one sleeve in order to eject the set medicament dosage.

* * * * *